US008992313B2

(12) United States Patent
Wright et al.

(10) Patent No.: US 8,992,313 B2
(45) Date of Patent: Mar. 31, 2015

(54) APPARATUS AND METHOD FOR PROVIDING A GAME

(75) Inventors: Dean Wright, New South Wales (AU); Stephen Cowan, New South Wales (AU)

(73) Assignee: Paltronics Australia PTY Limited, New South Wales (AU)

( * ) Notice: Subject to any disclaimer, the term of this patent is extended or adjusted under 35 U.S.C. 154(b) by 1951 days.

(21) Appl. No.: 11/577,074

(22) PCT Filed: Nov. 8, 2005

(86) PCT No.: PCT/AU2005/001709

§ 371 (c)(1), (2), (4) Date: Oct. 14, 2008

(87) PCT Pub. No.: WO2006/047837

PCT Pub. Date: May 11, 2006

(65) Prior Publication Data

US 2009/0227361 A1 Sep. 10, 2009

(30) Foreign Application Priority Data

Nov. 8, 2004 (AU) ................................ 2004906409

(51) Int. Cl.
*A63F 9/24* (2006.01)
*G06F 17/00* (2006.01)
*G07F 17/34* (2006.01)

(52) U.S. Cl.
CPC ...................................... *G07F 17/34* (2013.01)
USPC .................................. 463/27; 463/16; 463/26

(58) Field of Classification Search
None
See application file for complete search history.

(56) References Cited

U.S. PATENT DOCUMENTS

| | | | | | |
|---|---|---|---|---|---|
| 5,564,700 | A * | 10/1996 | Celona | ............................ | 463/27 |
| 5,611,730 | A * | 3/1997 | Weiss | .............................. | 463/20 |
| 5,941,773 | A * | 8/1999 | Harlick | ........................... | 463/26 |
| 6,015,347 | A * | 1/2000 | Maahs et al. | ..................... | 463/27 |
| 6,110,043 | A * | 8/2000 | Olsen | .............................. | 463/27 |
| 2005/0020340 | A1* | 1/2005 | Cannon | ........................... | 463/16 |

FOREIGN PATENT DOCUMENTS

| | | | |
|---|---|---|---|
| AU | 199743615 | A1 | 5/1998 |
| AU | 200030250 | A1 | 7/2000 |
| EP | 1 278 167 | A2 | 1/2003 |

OTHER PUBLICATIONS

Australian Patent Office. International Search Report. International Application No. PCT/AU2005/001709. Applicant: Paltronics Australasia Pty Limited. 3 pages. Feb. 6, 2006.

* cited by examiner

*Primary Examiner* — Paul A D'Agostino
(74) *Attorney, Agent, or Firm* — Sterne, Kessler, Goldstein & Fox P.L.L.C.

(57) ABSTRACT

An apparatus (1) for providing a game is disclosed, including memory (2) for storing data indicative of a game credit value (3), an input device (4) responsive to an input message from one of a plurality of input terminals (7) for providing a game credit value adjustment message, a controller (9) for adjusting the game credit value in response to the game credit value adjustment message, and a game trigger device (10) selectively operable to generate a game trigger message for causing the game to be executed using at least a portion of the game credit value as a stake value.

27 Claims, 8 Drawing Sheets

| Outcome | Payout |
|---|---|
| $R_1$ | stake * 2 |
| $R_2$ | stake * 3 |
| $R_3$ | stake * 8 |
| $R_4$ | stake * 25 |

20

FIG. 6

APPARATUS AND METHOD FOR PROVIDING A GAME

CROSS-REFERENCE TO RELATED APPLICATIONS

This application is a U.S. National Stage entry of co-pending International Patent Application No. PCT/AU2005/001709, filed on Nov. 8, 2005, by WRIGHT, Dean et al., entitled APPARATUS AND METHOD FOR PROVIDING A GAME, the entire contents of which is incorporated by reference, and for which priority is claimed under 35 U.S.C. § 371. As in the parent International Application No. PCT/AU2005/001709, priority is also claimed to co-pending Australia Patent Application No. 2004906409, filed on Nov. 8, 2004, the entire contents of which is also incorporated by reference and for which priority is claimed under 35 U.S.C. § 119.

FIELD OF THE INVENTION

The present invention relates to an apparatus and method for providing a game.

The invention has been developed primarily for use with a plurality of interlinked gaming machines in a gaming establishment and will be described hereinafter with reference to this application. However, it will be appreciated that the invention is not limited to this particular field of use. In particular, the invention also finds application in the fields of online gaming, gaming machines that are distributed in a plurality of gaming establishments, and the like. The invention also finds application in the provision of games at the point of sale in retail outlets.

BACKGROUND

Any discussion of the prior art throughout this specification should in no way be considered as an admission that such prior art is widely known or forms part of common general knowledge in the field.

It is known to link gaming machines to provide a number of additional functionalities. This includes the ability to control the awarding of a prize, as the pool of available funds is greater and the amount of funds available is known rather than having to be estimated. Another known purpose of interlinking gaming machines is to provide a secondary linked jackpot. In such a system, a central display provides players with a visual indication of a presently available jackpot prize that is increased incrementally as the players operate the interlinked gaming machines. It is known by the players that the jackpot will be awarded when it reaches a secret, randomly selected value that is less than a predetermined limit value. The limit value is often also indicated to the players by means of the display.

The use of such functionality is intended to attract players to play the machines in the hope of winning the linked jackpot. However, with increased sophistication of habitual players and their increased exposure to such systems, the systems' ability to maintain players' interest has diminished.

SUMMARY OF THE INVENTION

It is an object of the present invention to overcome or ameliorate at least one of the disadvantages of the prior art, or to provide a useful alternative.

According to a first aspect of the present invention there is provided an apparatus for providing a game, the apparatus including:

memory for storing data indicative of a game credit value;

an input device responsive to an input message from one of a plurality of input terminals for providing a game credit value adjustment message;

a controller for adjusting the game credit value in response to the game credit value adjustment message; and a game trigger device selectively operable to generate a game trigger message for causing the game to be executed using at least a portion of the game credit value as a stake value.

Preferably, the apparatus further includes a comparator for comparing the game credit value and a predetermined game trigger value stored in the memory, and wherein the game trigger device generates the game trigger message in response to the comparison when predetermined comparison criteria are satisfied.

Preferably, the apparatus further includes a prize setting device responsive to the adjusted game credit value for setting respective possible prize values for each of a plurality of possible outcomes of the game if played with the adjusted game credit value as a stake.

Preferably, the apparatus further includes a display controller for causing a display to show the possible outcomes and the respective possible prize values.

The controller preferably increments the game credit value in response to the game credit value adjustment message and the game trigger device generates the game trigger message when the adjusted game credit value equals or exceeds the game trigger value.

Preferably, the input device is adapted to extract quantum information from the input message and to include the quantum information in the game credit value adjustment message.

The predetermined game trigger value is preferably predetermined randomly, preferably between predetermined lower and upper game trigger limits. Alternatively, the game trigger value may be determined by an operator of the apparatus.

The input terminals preferably include a plurality of gaming machines which are preferably adapted to execute a regular game and a bonus game, the bonus game only being executed in response to the game trigger message.

Preferably the input message is generated by the gaming machine in response to at least one of: a user of the gaming machine adding gaming credit to the machine; a user of the gaming machine playing a game on the gaming machine; and a prize being won on the gaming machine.

In a preferred embodiment the input device is responsive to respective input messages from the plurality of input terminals, each input message identifying the source input terminal, and the game trigger device is adapted to send the game trigger message to the input terminal which caused the comparison to satisfy the criteria for generation of an game trigger message.

The apparatus preferably further includes a terminal polling device for polling the input terminals for input messages. The terminal polling device is preferably adapted to poll each input terminal sequentially during successive polling cycles.

The input device is preferably adapted to extract respective timestamps from the input messages. The input device may then generate game credit value adjustment messages associated with the input messages in order of timestamps.

In an alternative embodiment, the apparatus further includes a randomiser for randomising the order of consideration by the input device of received input messages.

A second aspect of the invention provides a system for providing a game including apparatus as set out above and a plurality of input terminals.

A third aspect of the invention provides a method for providing a game including the steps of:

storing data indicative of a game credit value;

receiving an input message from one of a plurality of input terminals and providing a game credit value adjustment message in response thereto;

adjusting the game credit value in response to the game credit value adjustment message;

generating a game trigger message for causing a game terminal to execute the game using at least a portion of the game credit value as a stake value.

The method preferably includes the further steps of storing a predetermined game trigger value, and comparing the game credit value with the game trigger value. In this case, the game trigger message is generated in response to the comparison when predetermined comparison criteria are satisfied.

The method preferably further includes setting respective possible prize values for each of a number of possible outcomes of the game if played with the adjusted game credit value as a stake value.

Preferably, the method further includes displaying the possible outcomes and the respective possible prize values on a display screen.

Preferably, the adjusting of the game credit value includes incrementing the game credit value in response to the game credit value adjustment message and the game trigger message is generated when the adjusted game credit value equals or exceeds the game trigger value.

The method preferably further includes the steps of extracting quantum information from the input message and including the quantum information in the game credit value adjustment message.

The predetermined game trigger value is preferably predetermined between predetermined lower and upper game trigger limits.

The method preferably further includes determining the predetermined game trigger value randomly. Alternative methods preferably include receiving the predetermined game trigger value from operator input.

The input message is preferably generated at a gaming machine in response to at least one of: a user of the gaming machine adding gaming credit to the machine; a user of the gaming machine playing a game on the gaming machine; and a prize being won on the gaming machine.

Preferably, the plurality of input terminals includes a plurality of gaming machines, which are preferably adapted to play a regular game and a bonus game, the bonus game only being executed in response to the game trigger message.

Respective input messages are preferably received from the plurality of input terminals, each input message identifying the source input terminal, and the method preferably further includes sending the game trigger message to the input terminal which caused the comparison to satisfy the criteria for generation of an game trigger message.

The method preferably further includes polling the input terminals for input messages. In such cases, each input terminal is preferably polled sequentially during successive polling cycles.

Preferably, the method includes extracting respective timestamps from the input messages. Alternatively, the method may include randomising the order of consideration by the input device of received input messages.

Further aspects of the invention include a computer program for causing a computer to execute a method as set out above, and such a computer program carried by a data carrier or a signal.

BRIEF DESCRIPTION OF THE DRAWINGS

A preferred embodiment of the invention will now be described, by way of example only, with reference to the accompanying drawings, in which:

FIG. 6 is a table of outcomes and payouts for a bonus game;

DETAILED DESCRIPTION

Figure 1:
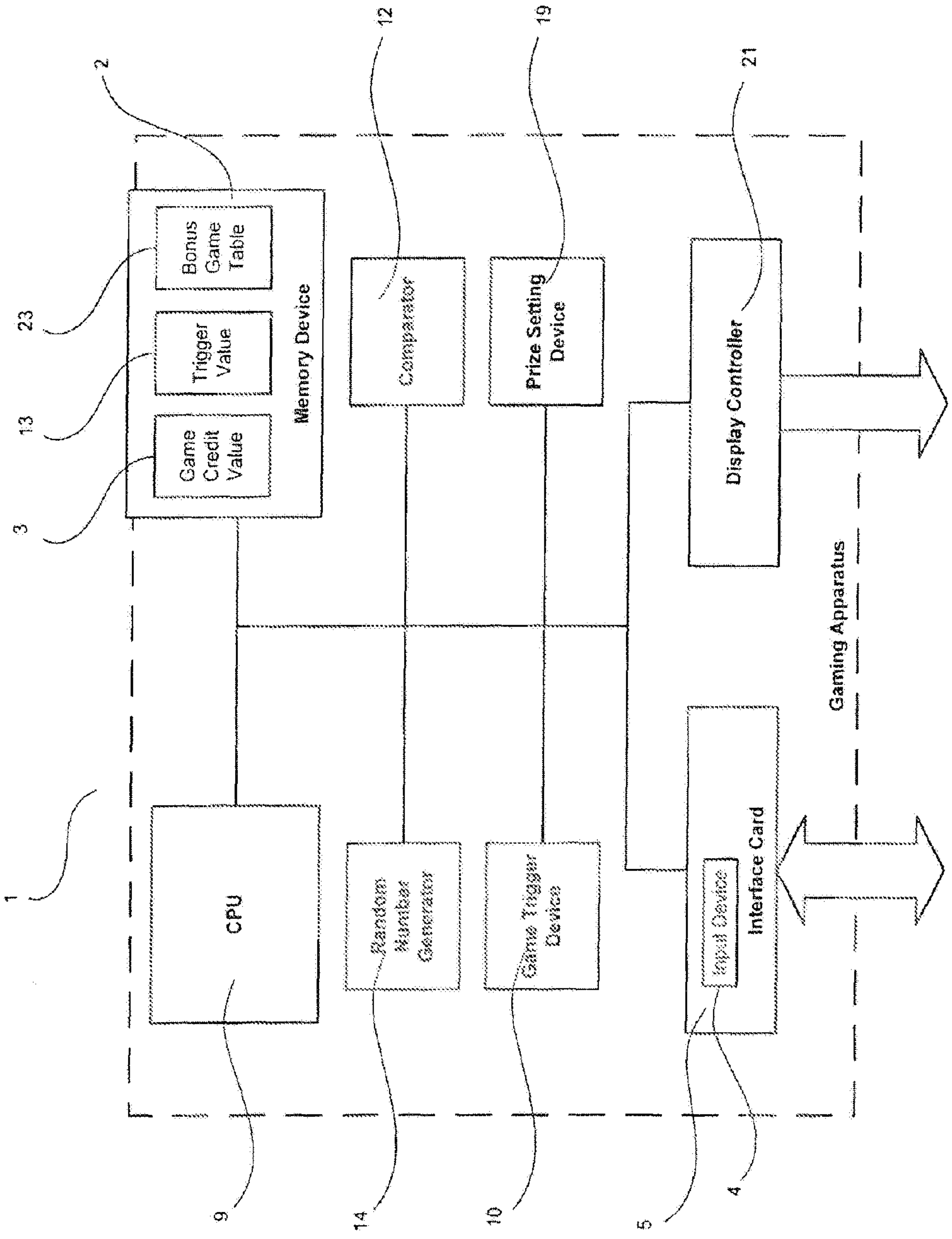
FIG. 1 is a schematic representation of a preferred embodiment of the invention.
Figure 2:
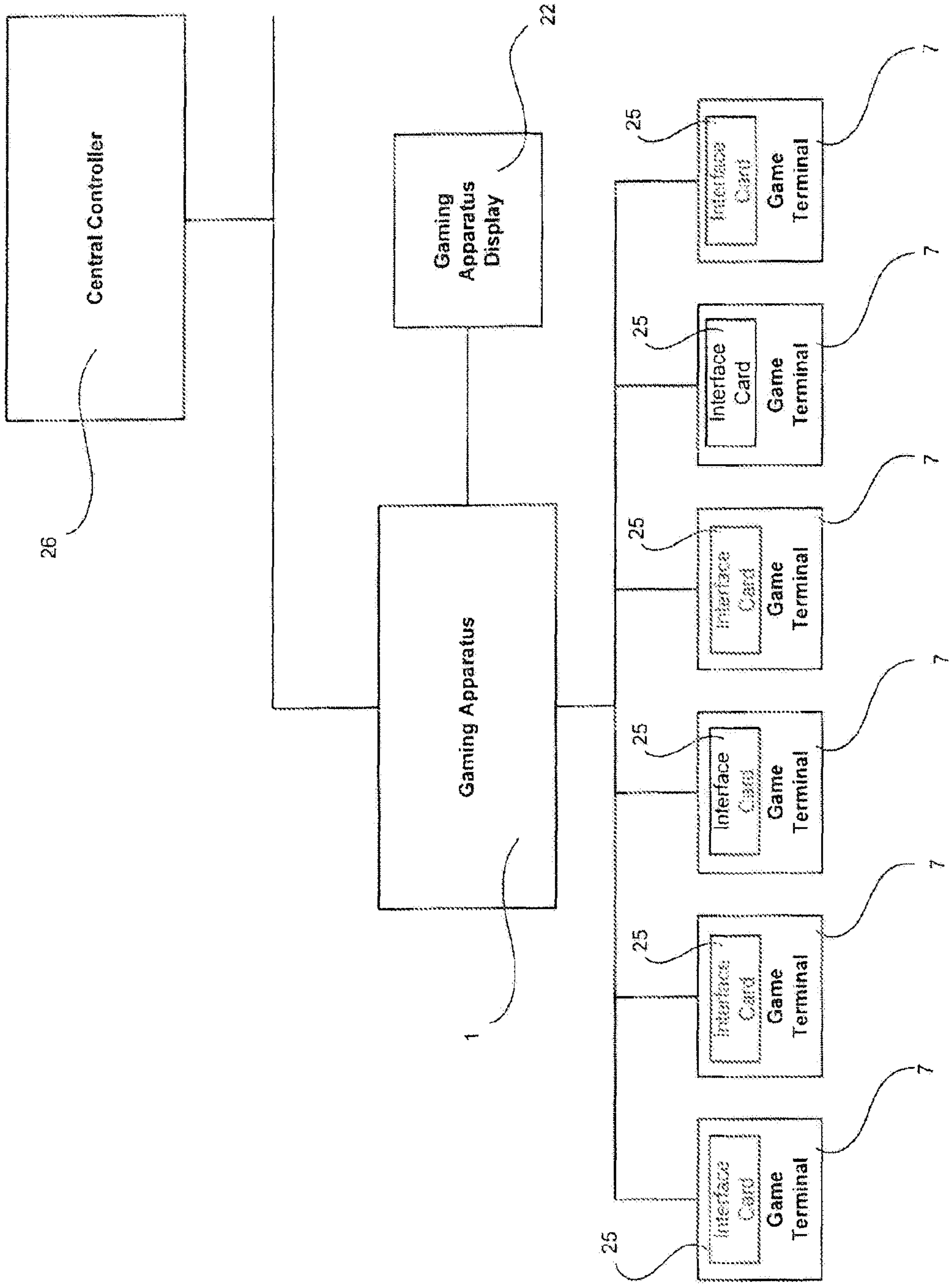
FIG. 2 shows the apparatus of FIG. 1 in use in a typical application.

Referring to FIG. 1, there is illustrated an apparatus 1 for providing a game. One embodiment of the apparatus 1 includes memory, in the form of solid-state memory 2, for storing data indicative of a game credit value 3. The memory employed in yet another embodiment is in the form of non-volatile memory. In one embodiment, the apparatus is a venue controller, including an input device 4, forming part of an interface card 5, responsive to respective input messages 6 from a plurality of input terminals, in the form of respective game terminals 7 in the same venue as the apparatus 1, as shown in FIG. 2. The input device 4 is responsive to an input message 6, shown in FIG. 3, for generating a game credit value adjustment message 8, shown in FIG. 4. A controller, in the form of a CPU 9, adjusts the game credit value 3 in response to the game credit value adjustment message 8.

Figure 5:
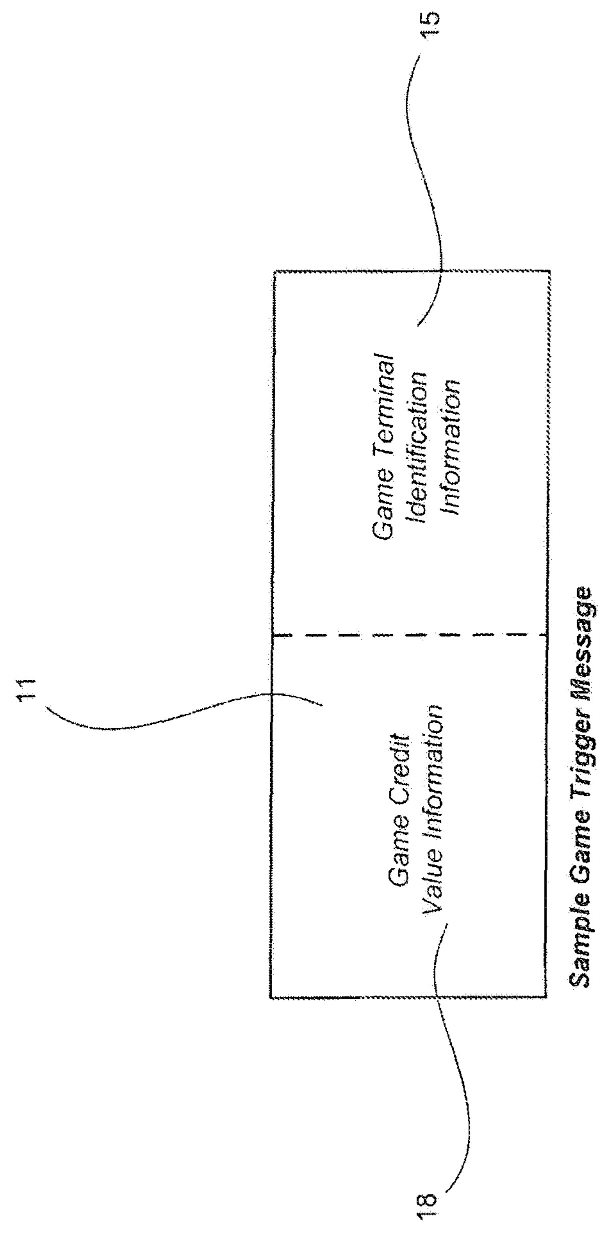
FIG. 5 is a schematic representation of a game trigger message.

The apparatus 1 further includes a game trigger device 10 for generating a game trigger message 11, shown in FIG. 5, for causing the game to be executed with at least a portion of the game credit value 3 as a stake value.

The preferred embodiment also includes a comparator 12 which compares the adjusted game credit value 3 and a game trigger value 13 stored in the memory 2. The game trigger device 10 generates the game trigger message 11 in response to the comparison, when predetermined comparison criteria are satisfied.

In an embodiment, the game is executed on the CPU 9 of the apparatus 1. In an alternative embodiment, the game trigger message 11 is passed to an interface card 25 of a selected game terminal 7 which responds by executing the game on the gaming terminal itself or, preferably on the interface card 25. The manner in which the game terminal is selected is described in further detail below. In yet a further embodiment, the apparatus 1 is in communication with a central controller 26 which communicated with a plurality of such apparatus in respective venues, to allow gaming to be linked across those venues. In one such embodiment, the game trigger message 11 is passed to the centralised game controller 26 which executes the game.

In the preferred embodiment, the CPU 9 increments the game credit value 3 stored in the memory 2 and the comparison criteria are that the game credit value 3 is equal to or greater than the game trigger value 13. However, in other embodiments other types of adjustment (e.g. decrement) and other comparison criteria may be used.

Additionally, in the preferred embodiment, the game trigger value 13 is predetermined between predetermined lower and upper game trigger limits randomly in a known manner using a random number generator 14. However in an alternative embodiment, the game trigger value 13 may be predetermined by an algorithm or by selection by an operator of the apparatus 1.

Figure 3:
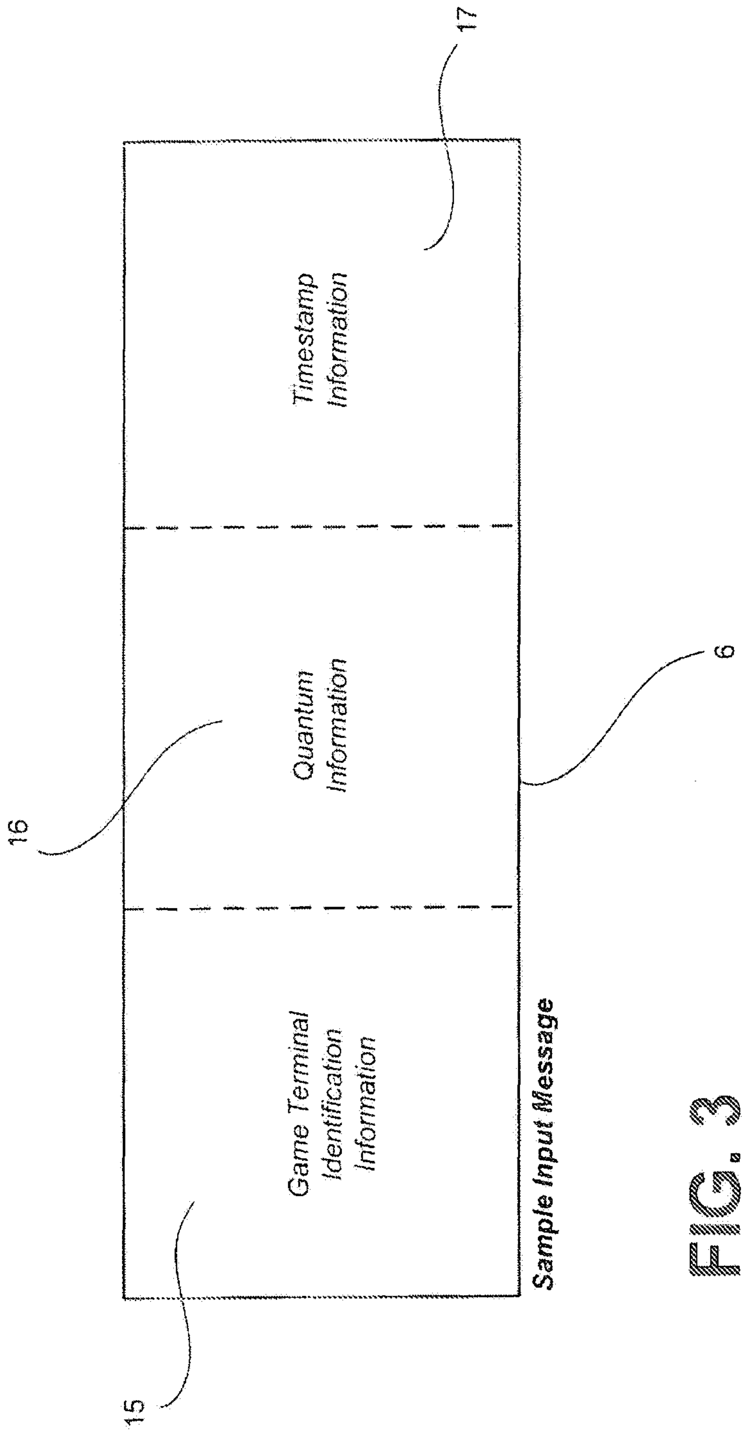
FIG. 3 is a schematic representation of an input message.

Referring to FIG. 3, input messages 6 are generated by the game terminals 7 in response to a user of a game terminal 7 adding gaming credit to the terminal 7 in a known way. In an alternative embodiment, the input messages 6 are generated instead in response to the commencement of a game on the game terminal 7. The input messages 6 are ordered sequences of data each including:

- Information 15 identifying the game terminal 7 generating the input message 6;
- Quantum information 16 indicative of the value of the gaming credit added to the game terminal 7 or of the credit staked on the game commenced on the game terminal 7; and
- Timestamp information 17 indicating the time at which the gaming credit was added to the game terminal 7.

The input device 4 polls the game terminals 7 sequentially for input messages 6.

Figure 4:
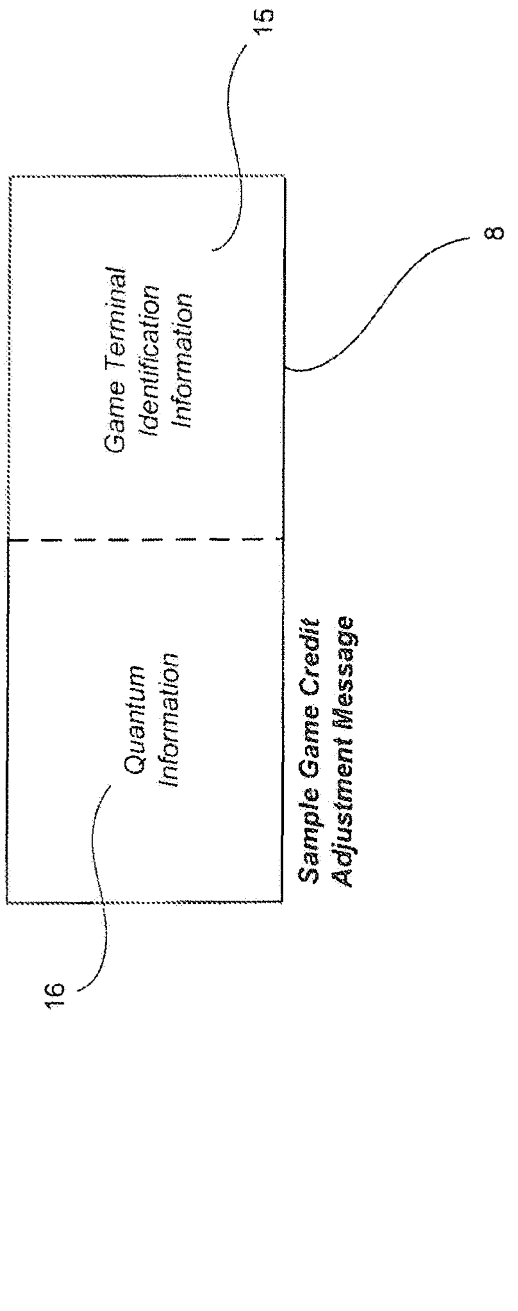
FIG. 4 is a schematic representation of a game credit value adjustment message.

Received input messages 6 are processed in order by reference to the timestamp information 17. In response to each received input message 6, the input device 4 generates a respective game credit value adjustment message 8. Referring to FIG. 4, the credit value adjustment messages 8 are ordered sequences of data each including:

- The quantum information 16 from their respective input message 6; and
- The game terminal identification information 15 from their respective input message 6.

In an alternative embodiment, the input messages 6 do not include timestamp information. In this case, the input device 4 polls each of the game terminals once during each of successive polling cycles. Input messages 6 received during a polling cycle are processed in a random order determined using the random number generator 14. In other respects, the input messages 6 are processed as set out above.

In the preferred embodiment, the controller 9 increments the game credit value 3 by an amount related to the quantum information 16 and therefore related to the value of gaming credit added to the game terminal 7. In the embodiment described in further detail below, the increment is a percentage of the gaming credit added to the game terminal 7 which generated the input message 6. However, in alternative embodiments, the increment could be determined according to a banded scale or as a flat rate or as a combination of a percentage and a flat rate or banded scale. In further alternative embodiments, the quantum information 16 and the increment are determined as a percentage of any one or more of:

- credit staked on games played on the game terminal 7;
- the total amount of money won during one or more games played on the game terminal 7;
- the total amount of cash inserted into the game terminal 7;
- the total value of notes inserted into the game terminal 7;
- the total value of coins inserted into the game terminal 7;
- the total value of non-cash credit added to the game terminal 7 (i.e. the total credit added less the total amount of cash inserted) added instead by smart card for example; or
- the number of games played on the game terminal 7.

When the comparator 12 detects that the game credit value 3 is equal to or greater than the game trigger value 13, the game trigger device 10 generates a game trigger message 11. Referring to FIG. 5, the game trigger message 11 is an ordered sequence of data including:

- Information 18 indicative of the game credit value 3; and
- The game terminal identification information 15 from the most recently processed game credit value adjustment message 8.

In a further alternative embodiment in which the input messages 6 do not include timestamp information, the input messages 6 received in a particular polling cycle are processed in order of receipt by the apparatus 1. When the comparator 12 detects that the comparison criteria are satisfied, a game trigger message 11 is generated including game terminal identification information 15 from an input message 6 selected at random from the messages received during that polling cycle.

In yet a further alternative embodiment, in which the apparatus 1 does not include a comparator 12, the game trigger device 10 generates a game trigger message 11 after each polling cycle.

In embodiments in which the game is executed on the game terminal 7, the game trigger message 11 is received by the game terminal 7 identified by the game terminal identification information 15. The game terminals 7 are programmed to play both a regular game, in response to the player adding gaming credit, and a bonus game, in response to receiving a game trigger message 11. Having received a game trigger message 11, the game terminal 7 then executes the bonus game using as the stake for the game the game credit value 3 or the game trigger value 13 included in the game trigger message 11.

The apparatus 1 further includes a prize setting device, in the form of circuitry 19. After each increment of the game credit value 3, the prize setting device 19 is responsive to the game credit value 3 for updating a table 20, shown in FIG. 6, of possible prize values for each of a plurality of possible outcomes of the game if played with the adjusted game credit value 3 as a stake. The prize setting circuitry 19 is controlled by the CPU 9 to set the possible prizes in accordance with a predetermined scheme. For example, if a game having four possible outcomes $R_1 \ldots R_4$ having respective probabilities ½, ⅓, ⅛, 1/25 is played, the prize setting device 19 may calculate the possible prizes as the following respective multiples of the stake: 2, 3, 8, 25.

In another embodiment, the prize setting device sets prizes for the possible outcomes of the bonus game which are not dependent upon the stake. For example, in a bonus game having four possible outcomes having respective probabilities of 85%, 10%, 4% and 1%, the prize setting device of an embodiment, sets flat rate prizes of $100, $1,000, $10,000 and $100,000 respectively. In a further embodiment, the prizes for each outcome is substantially inversely proportional to the probability of that outcome.

The apparatus 1 further includes a display controller, in the form of a video card 21, for controlling a display 22 shown in FIG. 2. The display 22 is caused to show the possible outcomes and the associated respective possible prize values from the table 20. In some embodiments in which the prizes are dependent upon the value of the stake, the prize setting device 19 updates the prizes associated with each outcome after each increment of the game credit value, and players viewing the display 22 may at all times see the possible prizes if the bonus game were to be triggered at that moment.

In embodiments in which the game is executed on the CPU 9 of the apparatus 1, the display controller 21 additionally passes video signals to the game terminal 7 identified by the game terminal identification information 15, or all game terminals, to enable it or them to display the game on an integral or associated display screen. In a further embodiment in which the apparatus is in communication with a central controller 26, as described above, the apparatus also passes information regarding the game to the central controller to enable the game to be displayed on respective displays 22 at other venues, and/or on display screens integral to or associated with gaming terminals 7 at those venues.

The bonus game may be any game on which a wager may be placed. For example, the bonus game may be another electronic gaming machine game, roulette, blackjack, craps, poker, baccarat, horse racing, etc.

Examples of specific applications of the invention will now be described.

Example One

Referring to FIG. 2, the apparatus 1 is located in a gaming establishment including ten gaming machines 7 and a plasma display screen 22. The gaming machines 7 are in communication with the apparatus 1 in a known way, for example, a wired or wireless local area network.

The gaming machines 7 are programmed to play a game with a return to player (RTP) of 87%. However the advertised RTP is 88.85%. The shortfall is made good by each machine passing 1.85% of added gaming credit to the apparatus 1 for use as stake money for the bonus game, which has a return to player of 100%.

When a user adds gaming credit to one of the gaming machines 7, an input message 6 is generated as described above. The quantum information 16 included in the input messages 6 is a percentage, in this case, 1.85%, of the gaming credit added to the machine 7.

The apparatus 1 polls the gaming machines 7 sequentially for input messages 6 which are transmitted, received and processed as described above.

The following table shows, in chronological order of timestamps, turnover values (i.e. inserted credit amounts) for the ten gaming machines 7, respective 1.85% contribution to the game credit value 3 and the cumulative game credit value:

| Machine number | Total turnover ($) | Contribution ($) | Cumulative game credit value ($) |
|---|---|---|---|
| 5 | 1.00 | 0.02 | 0.02 |
| 1 | 10.00 | 0.19 | 0.21 |
| 3 | 5.00 | 0.09 | 0.3 |
| 2 | 2.50 | 0.05 | 0.35 |
| 6 | 1.00 | 0.02 | 0.37 |
| 7 | 1.00 | 0.02 | 0.39 |
| 4 | 2.50 | 0.05 | 0.44 |
| 10 | 1.00 | 0.02 | 0.46 |
| 8 | 5.00 | 0.09 | 0.55 |
| 9 | 2.00 | 0.04 | 0.59 |
| Total | $31.00 | $0.59 | |

Typically, poker machines permit the player to choose the number of lines on which he wishes to bet and the value of the bet he wishes to make per line. The following table 23, stored in the memory 2, shows the available options in the bonus game for the number of lines and the credits per line.

Total cost (in credits) of bet given choices of number of lines and credits per line

| | | Lines | | | | |
|---|---|---|---|---|---|---|
| | | 1 | 5 | 10 | 20 | 25 |
| Credits per line | 1 | 1 | 5 | 10 | 20 | 25 |
| | 2 | 2 | 10 | 20 | 40 | 50 |
| | 5 | 5 | 25 | 50 | 100 | 125 |
| | 10 | 10 | 50 | 100 | 200 | 250 |
| | 20 | 20 | 100 | 200 | 400 | 500 |

In this bonus game, 1 credit=$0.01 and it may easily be seen from the table that wagers may be placed having one of the following values:

| | | |
|---|---|---|
| $0.01 | $0.02 | $0.05 |
| $0.10 | $0.20 | $0.25 |
| $0.50 | $1.00 | $2.00 |
| $2.50 | $4.00 | $5.00 |

After processing all of the input messages 6 in this polling cycle, the game trigger device 10 then generates a game trigger message 11 including information indicative of the fact that the game credit value 3 is sufficient for a wager of $0.50, which is one of the possible wager amounts included in the table. The game trigger message 11 also includes game terminal identification information 15 identifying gaming machine no. 8 as the terminal that made the contribution to game credit which enabled the wager to be made.

The bonus game has 12 possible outcomes having respective probabilities as shown in the following table. The table also shows the payout coefficient by which the stake is multiplied for each possible outcome.

| Outcome | Probability | Payout coefficient |
|---|---|---|
| 1 | 0.1% | 1000 |
| 2 | 0.4% | 250 |
| 3 | 1.0% | 100 |
| 4 | 1.0% | 100 |
| 5 | 2.5% | 40 |
| 6 | 5.0% | 20 |
| 7 | 5.0% | 20 |
| 8 | 10.0% | 10 |
| 9 | 10.0% | 10 |
| 10 | 20.0% | 5 |
| 11 | 20.0% | 5 |
| 12 | 25.0% | 4 |
| Total | 100.0% | |

The game trigger message 11 is received by the controller, which executes the bonus game. Outcome 9 is realised, for which the payout is 10×$0.50=$5.00. The display controller 21, under control of the controller 9, causes a visual indication of the bonus game to be displayed on the plasma screen 22. The controller 9 sends a payout message to the gaming machine no. 8 in a manner known for example from existing linked jackpot systems.

Example Two

This example is identical to that set out in example one, with the exception that the payout coefficients for outcomes 9 and 10 are zero. Thus, the bonus game has an RTP of 70%.

In this way, adjustments to the overall RTP may be made.

Additionally or alternatively, a portion of or the entire RTP shortfall from the bonus game may be accrued towards a credit value for a further game as described herein or to a linked jackpot of a known type.

In a preferred embodiment, when a bonus game is executed and the controller determines that the outcome is one for which no payout is to be made, the display controller 9 does not cause any visual indication of the bonus game to be given on the plasma screen 22.

Example Three

This example is similar to example one with the exception that a target game trigger value 13 is preselected from the table shown in connection with that example.

The controller 9 selects one of these values at random in a known manner using the random number generator 14 and stores the value in the memory 2 as the game trigger value 13. For the sake of this example, we shall assume that the selected game trigger value is $2.00.

In this example, $0.58 remains from a previous bonus game credit value or from a previous polling cycle. The game terminals 7 are polled for input messages as above. The turnover for each machine, the contribution towards the bonus game credit value and the cumulative credit value are shown in the following table:

| Machine number | Total turnover ($) | Contribution ($) | Cumulative game credit value ($) |
|---|---|---|---|
| Carried over | | 0.58 | 0.58 |
| 5 | 13.00 | 0.24 | 0.82 |
| 1 | 5.00 | 0.09 | 0.91 |
| 3 | 8.00 | 0.15 | 1.06 |
| 2 | 2.50 | 0.05 | 1.11 |
| 6 | 0.00 | 0.00 | 1.11 |
| 7 | 7.50 | 0.14 | 1.25 |
| 4 | 5.00 | 0.09 | 1.34 |
| 10 | 12.00 | 0.22 | 1.56 |
| 8 | 25.00 | 0.46 | 2.02 |
| 9 | 5.00 | 0.09 | 2.11 |
| Total | $83.00 | $2.11 | |

After the input message from gaming machine number 8 has been processed, the comparator 12 finds that the game credit value 3 exceeds the game trigger value 13. The game trigger device 10 responds by generating a game trigger message 11. The game trigger message 11 includes information indicative of the fact that the game credit value 3 exceeds $2.00 and information identifying gaming machine no, 8. The game trigger message 11 is received by the controller 9, which responds by executing the bonus game with a stake value of $2.00. In addition, the controller 9 subtracts $2.00 from the stored game credit value 3. The remaining $0.11 is retained for the next bonus game.

The bonus game is executed as described above.

In the three above-described examples, once the bonus game has been completed, any won credit is redeemed in a known manner. For example, winnings may be collected by way of a cash payout from the terminal or transfer to the credit meter of the terminal, the update of the player's smartcard by the terminal, or the player may seek payment of the winnings from a cashier or other centralised payment point.

Example Four

This example is again similar to that described in example one. However, in this example, outcomes 1 and 2 have a payout coefficient of zero. Instead, flat rate standalone jackpot prizes of $10,000 and $1,000 respectively are awarded in the event of these outcomes, independently of the stake with which the game was played. This is illustrated in the following table.

| Outcome | Probability | Payout coefficient | Jackpot $ |
|---|---|---|---|
| 1 | 0.1% | 0 | 10,000 |
| 2 | 0.4% | 0 | 1000 |
| 3 | 1.0% | 100 | 0 |
| 4 | 1.0% | 100 | 0 |
| 5 | 2.5% | 40 | 0 |
| 6 | 5.0% | 20 | 0 |
| 7 | 5.0% | 20 | 0 |
| 8 | 10.0% | 10 | 0 |
| 9 | 10.0% | 10 | 0 |
| 10 | 20.0% | 5 | 0 |
| 11 | 20.0% | 5 | 0 |
| 12 | 25.0% | 4 | 0 |
| Total | 100.0% | | |

While this example has been described with two outcomes giving rise to a standalone jackpot being awarded, variants of this example include arrangements in which any or all of the outcomes give rise to the award of a standalone jackpot instead of, or in addition to, a prize dependent upon the stake.

Example Five

In a final example described with reference to FIGS. 8 and 9, the input terminals 7 are cash registers or other devices located at the point of sale of a retail or food outlet. Each terminal 7 is in communication with the apparatus 1 via a wide area network or the internet 24. The input terminals 7 generate input messages 6 each time a purchase of a particular product is made. The input messages include quantum information 16 indicative of the cost of the product or, in an alternative embodiment, indicative of the total cost of the transaction, for example a percentage of the cost of the transaction. In a further embodiment, the input messages may only be generated in connection with the sale of a particular product, and the quantum information 16 is indicative of the quantity of that particular product sold in a transaction. This embodiment may be used, for example, in a fast-food outlet and the particular product is hamburgers, as described in connection with a linked jackpot system in our copending Australian patent application no. 2003905792 and PCT application published as WO2005/04123 which are incorporated by reference below.

In any event, the procedure for determining whether or not a bonus game is to be executed is as set out in any of the preceding examples.

Figure 7:
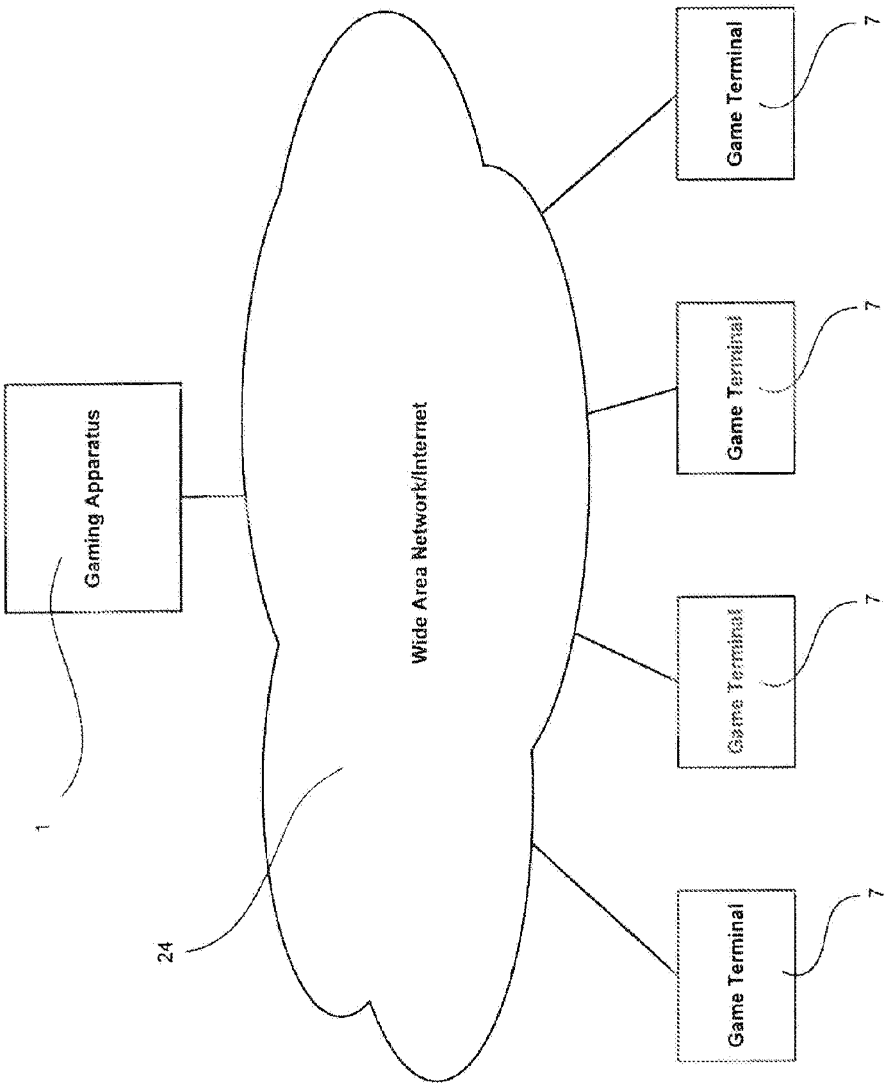
FIG. 7 shows the apparatus of FIG. 1 in a second typical application.

In one embodiment shown in FIG. 7, the game trigger message 11 is transmitted to the input terminal 7 identified in the message and the bonus game is executed on the input terminal.

Figure 8:
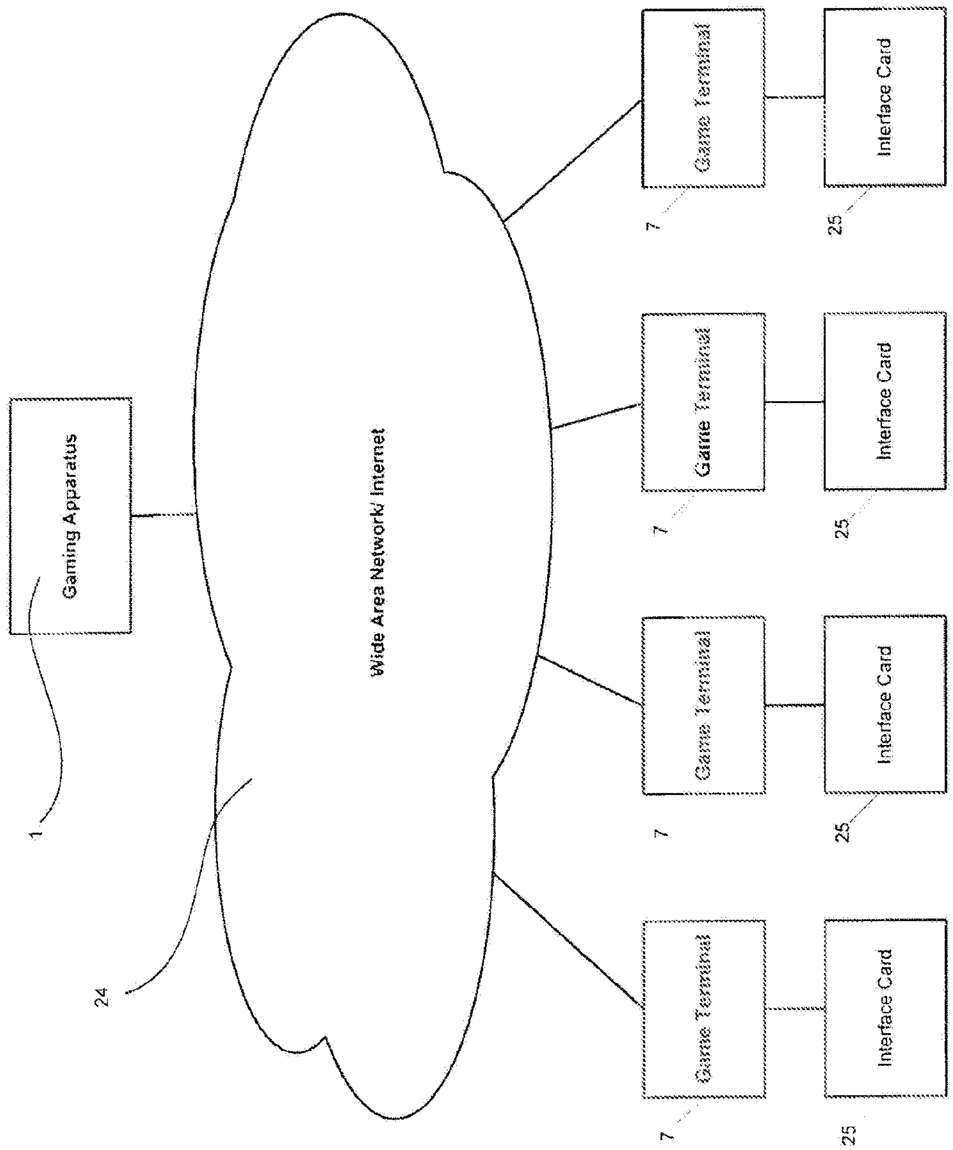
FIG. 8 shows the apparatus of FIG. 1 in a third typical application.

In a further embodiment shown in FIG. 8, the input message is transmitted to a game terminal 24 associated and collocated with the input terminal 7 and the game terminal executes the bonus game. However, in a variation of this embodiment, the bonus game is executed by the controller 9. In this variation, the display controller 21 causes a visual representation of the game to be displayed on the game terminal 24 associated with the input terminal 7 identified in the game trigger message 11.

Any winnings from the game are paid to the customer who made the purchase which triggered the game in one of a number of ways, including: as a cash refund, a discount, a credit voucher or as a free product.

In this specification the word "random" is to be taken to include "pseudo-random". References to values being chosen at random are to be taken to mean that those values are selected such that they remain unpredictable to an observer in a reasonable period of time.

Although the invention has been described with reference to specific examples, it will be appreciated by those skilled in that art that it may be embodied in many other forms. In particular, features of any one of the various described examples may be provided in any combination in any of the other described examples.

In addition, the invention may be embodied in, or in combination with, the systems disclosed in our copending Australian patent application numbers 2003903769, 2004902460, 2003905792, 2004902465, 2004900978, 2004905518, 2004902469 and 2004902459, and PCT publication WO02005/04123 A1, the entire contents of all of which are hereby incorporated by reference.

Furthermore, the functionality of the comparator 12, the prize setting device 19, the random number generator 14, the interface card 5, the game trigger device 10 and the display controller 21 have been described as being performed by distinct devices, such as dedicated integrated circuits. However, in preferred embodiments, all or any combination of their functionality may instead be performed by multi-purpose integrated circuits or implemented in software executed by the controller 9. Particularly in such cases, the invention may additionally be embodied in a computer program or in a computer program in a data signal or stored on a data carrier.

The invention claimed is:

1. A networked game controller for providing a bonus game, the networked game controller comprising:
- an input device configured to receive, over a network, a plurality of input messages from a plurality of gaming machines; and
- a processor configured to:
  - increment a stored game credit value in response to the plurality of input messages such that the plurality of gaming machines collectively contribute to the stored game credit value,
  - compare the incremented stored game credit value with a stored game trigger value,
  - in the event that the incremented stored game credit value equals or exceeds the stored game trigger value, determine that the bonus game is to be triggered,
  - in response to triggering of the bonus game, perform a machine selection process to identify a particular gaming machine of the plurality of gaming machines at which the bonus game is to be played,
  - provide to the particular gaming machine a first signal representative of the bonus game,
  - allow a player of the particular gaming machine to wager the incremented stored game credit value as a stake in the bonus game,
  - determine an outcome for the bonus game such that the player has a probabilistic chance of winning a prize in the bonus game based on wagering of the incremented stored game credit value, and
  - in the case that the determined outcome is a winning outcome for the player, provide a second signal to the particular gaming machine thereby to increase a value of a credit meter at the particular gaming machine by a prize value corresponding to the prize.

2. The networked game controller according to claim 1, wherein the stored game trigger value is between predetermined lower and upper game trigger limits.

3. The networked game controller according to claim 1, wherein the stored game trigger value is determined randomly.

4. The networked game controller according to claim 1, wherein the stored game trigger value is determined by an operator of the networked game controller.

5. The networked game controller according claim 1, wherein each gaming machine of the plurality of gaming machines corresponds input terminal of a plurality of input terminals.

6. The networked game controller according to claim 1, wherein the plurality of input messages is generated by the plurality of gaming machines in response to at least one of:
- a user of a corresponding gaming machine from among the plurality of gaming machines adding gaming credit to the corresponding gaming machine;
- the user of the corresponding gaming machine playing, a game on the corresponding gaming machine; and
- the prize being won on the corresponding gaming machine.

7. The networked game controller according to claim 1, wherein the networked game controller is further configured to set respective possible prize values for each of a plurality of possible outcomes of the bonus game.

8. The networked game controller according to claim 1, wherein each of the plurality of input messages is indicative of a corresponding contribution value of a plurality of contribution values provided by a corresponding gaming machine of the plurality of gaming machines.

9. The networked game controller according to claim 1, wherein each input message of the plurality of input messages identifies a corresponding gaming machine of the plurality of gaming machines.

10. The networked game controller according to claim 7, further comprising:
- a display configured to cause a display to show the plurality of possible outcomes and the respective possible prize values.

11. The networked game controller according to claim 9, further comprising:
- a polling game controller configured to poll the plurality of gaming machines for the plurality of input messages.

12. The networked game controller according to claim 11, wherein the polling game controller is configured to poll each gaming machine of the plurality of gaming machines sequentially during successive polling cycles.

13. The networked game controller according to claim 12, wherein the input device is further configured to extract respective timestamps from the plurality of input messages.

14. The networked game controller according to claim 12, further comprising:
- a randomiser configured to randomize an order of consideration of the received plurality of input messages.

15. A method, performed by a networked game controller, for providing player bonus game, the method comprising:
- receiving, over a network, a plurality of input messages from a plurality of gaming machines;
- incrementing a stored game credit value in response to the plurality of input messages such that the plurality of gaming machines collectively contribute to the stored game credit value;
- upon incrementing the stored game credit value, comparing the incremented stored game credit value with a stored game trigger value;

in the event that the incremented stored game trigger value equals or exceeds the game trigger value, determining that the bonus game is to be triggered;

in response to triggering of the bonus game, performing a machine selection process to identify a particular gaming machine of the plurality of gaming machines at which the bonus game is to be played;

providing to the particular gaming machine a first signal representative of the bonus game;

allowing a player of the particular gaming machine to wager the incremented stored game credit value as a stake in the bonus game;

determining an outcome for the bonus game such that the player has a probabilistic chance of winning a prize in the bonus game based on wagering of the incremented stored game credit value; and in the case that the determined outcome is a winning outcome for the player, providing a second signal to the particular gaming machine to increase a credit meter at the particular gaming machine by a prize value corresponding to the prize.

16. The method according to claim 15, wherein the stored game trigger value is between predetermined lower and upper game trigger limits.

17. The method according to claim 15, further comprising: determining the stored game trigger value randomly.

18. The method according to claim 15, further comprising: receiving the stored game trigger value from an operator input.

19. The method according to claim 15, further comprising: generating the plurality of input messages at the plurality of gaming machines in response to at least one of a user of a corresponding gaming machine from among the plurality of gaming machines adding gaming credit to the corresponding gaming machine, the user of the corresponding gaming machine playing a game on the corresponding gaming machine; and the prize being won on the corresponding gaming machine.

20. The method according to claim 15, further comprising: setting respective possible prize values for each of a plurality of possible outcomes of the bonus game.

21. The method according to claim 15, wherein each input message of the plurality of input messages is indicative of a contribution to the stored game credit value of a corresponding gaming machine of the plurality of gaming machines.

22. The method according to claim 15, wherein each input message-of the plurality of input messages is indicative of a corresponding gaming machine of the plurality of gaming machines.

23. The method according to claim 20, further comprising: displaying the plurality of possible outcomes and the respective possible prize values on a display screen.

24. The method according to claim 22, further comprising: polling the plurality of gaming machines for the plurality of input messages.

25. The method according to claim 24, wherein the polling comprises: including polling the plurality of gaming machines sequentially during successive polling cycles.

26. The method according to claim 24, further comprising: extracting respective timestamps from the plurality of input messages.

27. The method according to claim 25, further comprising: randomising an order of consideration of the received plurality of input messages.

* * * * *

UNITED STATES PATENT AND TRADEMARK OFFICE

CERTIFICATE OF CORRECTION

PATENT NO. : 8,992,313 B2
APPLICATION NO. : 11/577074
DATED : March 31, 2015
INVENTOR(S) : Wright et al.

It is certified that error appears in the above-identified patent and that said Letters Patent is hereby corrected as shown below:

Title page, item 73, Assignee, please replace “Paltronics Australia PTY Limited” with --Paltronics Australasia PTY Limited--

Signed and Sealed this
Sixteenth Day of February, 2016

Michelle K. Lee
*Director of the United States Patent and Trademark Office*